(12) United States Patent
Kimura et al.

(10) Patent No.: US 9,075,213 B2
(45) Date of Patent: Jul. 7, 2015

(54) PLASTIC OPTICAL FIBER CABLE

(75) Inventors: Tsuyoshi Kimura, Toyama (JP);
Yoshihiro Tsukamoto, Toyama (JP);
Kouji Asano, Toyama (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 0 days.

(21) Appl. No.: 14/344,368

(22) PCT Filed: Sep. 14, 2012

(86) PCT No.: PCT/JP2012/073670
§ 371 (c)(1),
(2), (4) Date: Mar. 12, 2014

(87) PCT Pub. No.: WO2013/039218
PCT Pub. Date: Mar. 21, 2013

(65) Prior Publication Data
US 2014/0341518 A1  Nov. 20, 2014

(30) Foreign Application Priority Data

Sep. 14, 2011 (JP) .................... 2011-200933

(51) Int. Cl.
*G02B 6/44* (2006.01)
*G02B 6/02* (2006.01)
*G02B 6/12* (2006.01)

(52) U.S. Cl.
CPC .............. *G02B 6/443* (2013.01); *G02B 6/4436* (2013.01); *G02B 6/448* (2013.01); *G02B 6/02033* (2013.01); *G02B 6/02395* (2013.01); *G02B 2006/12069* (2013.01)

(58) Field of Classification Search
CPC .............. G02B 6/443; G02B 6/02033; G02B 6/02395; G02B 6/4436; G02B 2006/12069
USPC ................... 385/100–102, 122–128
See application file for complete search history.

(56) References Cited

U.S. PATENT DOCUMENTS 5,115,487 A * 5/1992 Blyler et al. ............... 385/128
2008/0110663 A1* 5/2008 Jow et al. ............... 174/113 C
(Continued)

FOREIGN PATENT DOCUMENTS

JP  58-149003 A  9/1983
JP  60-222808 A  11/1985
(Continued)

OTHER PUBLICATIONS

International Search Report dated Nov. 6, 2012, issued in International Application PCT/JP2012/073670.
(Continued)

*Primary Examiner* — Ryan Lepisto
*Assistant Examiner* — Guy Anderson
(74) *Attorney, Agent, or Firm* — Fitch, Even, Tabin & Flannery LLP

(57) ABSTRACT

Provided is a plastic optical fiber cable including a plastic optical fiber 12 comprising of a core 11A and a cladding 11B, and a jacketing layer covering the plastic optical fiber 12, in which the jacketing layer includes at least two layers of an inner layer 13 and an outer layer 14, the inner layer 13 is formed of a resin comprising of a copolymer of ethylene and a (meth)acrylic compound, and the outer layer 14 is formed of a fluorine-based resin. A plastic optical fiber cable excellent in flame retardance, appearance, and processability at the time of use is obtained from the plastic optical fiber cable described above.

16 Claims, 1 Drawing Sheet

(56) References Cited

U.S. PATENT DOCUMENTS

| | | | |
|---|---|---|---|
| 2009/0279837 A1* | 11/2009 | Aoyagi et al. | 385/128 |
| 2012/0008907 A1* | 1/2012 | Nakamura et al. | 385/124 |
| 2012/0177329 A1* | 7/2012 | Sakabe et al. | 385/100 |
| 2012/0243842 A1* | 9/2012 | Lin et al. | 385/123 |
| 2014/0023330 A1* | 1/2014 | Blew | 385/113 |
| 2014/0119698 A1* | 5/2014 | Sakabe et al. | 385/100 |

FOREIGN PATENT DOCUMENTS

| | | |
|---|---|---|
| JP | 61-231510 A | 10/1986 |
| JP | 61-279812 A | 12/1986 |
| JP | 64-084205 A | 3/1989 |
| JP | 02-123304 A | 5/1990 |
| JP | 02-257105 A | 10/1990 |
| JP | 03-039710 A | 2/1991 |
| JP | 05-011151 A | 1/1993 |
| JP | 09-236735 A | 9/1997 |
| JP | 2809721 B2 | 10/1998 |
| JP | 2838895 B2 | 12/1998 |
| JP | 2882703 B2 | 4/1999 |
| JP | 2004-219815 A | 8/2004 |

OTHER PUBLICATIONS

Written Opinion dated Nov. 6, 2012, issued in International Application PCT/JP2012/073670.

* cited by examiner

PLASTIC OPTICAL FIBER CABLE

CROSS-REFERENCE TO RELATED APPLICATIONS

This Application is a U.S. National Stage Application filed under 35 U.S.C. §371 of International Application PCT/JP2012/073670, filed Sep. 14, 2012, designating the United States, which claims priority from Japanese Patent Application 2011-200933, filed Sep. 14, 2011, the complete disclosures of which are hereby incorporated herein by reference in their entirety for all purposes.

TECHNICAL FIELD

The present invention relates to a plastic optical fiber cable excellent in flame retardance.

BACKGROUND ART

An optical fiber is used for optical transmission, illumination, decoration, a display, and the like. An inorganic glass-based optical fiber exhibits excellent optical transmission property over a wide range of wavelengths, but there are problems that the processability thereof is poor and the mechanical durability thereof is weak. On the other hand, a plastic optical fiber (hereinafter, it is referred to as "POF") has a structure in which a core is mainly formed of a resin with high transparency, such as polymethyl methacrylate, and the periphery thereof is cladded with a transparent resin with a lower refractive index than that of the core. Hence a POF is characterized in that the flexibility and the processability thereof are superior to a glass-based optical fiber. In addition, the transmittable distance of a POF has been increased as the production technique thereof has been improved, and thus a POF is used as a transmission medium of optical information for shorter distance LAN or various communications.

In general, at the time of using a POF, a POF is rarely used as a single body of POF except for illumination application, but is often used as a POF cable in which a POF is covered with a thermoplastic resin in order to impart mechanical strength, heat resistance, flame retardance or the like. Particularly in recent years, the regulation on flame retardance of a plastic product has become strict, and a POF cable with high flame retardance is also desired.

A POF itself is formed of an inflammable plastic such as polymethyl methacrylate, and thus is easily burned. For that reason, it is possible to impart flame retarding effect to a POF to a certain extent by forming into a POF cable by covering a POF with a resin having high flame retardance, for example, a vinyl chloride resin or a chlorinated polyethylene resin, or a flame retardant resin dispersed with a large amount of various kinds of flame retardants such as a halogen-based one, a phosphorus-based one, magnesium hydroxide, and the like.

For example, in Patent Literature 1, a flame retarding POF code, in which the periphery of a POF is covered with a polyethylene-based resin composition including magnesium hydroxide and red phosphorus, is suggested.

In Patent Literature 2, a POF cable, in which the outside of a POF is covered with a first jacketing layer of a resin that is not heat fused with a cladding and the outside of the first jacketing layer is covered with a fluorine-based resin, is suggested.

In addition, in Patent Literature 3, there is a suggestion on a POF cable, in which the outside of a POF is covered with a polyolefin resin including magnesium hydroxide and the outside of the polyolefin resin is covered with a resin including a vinylidene fluoride-chlorotrifluoroethylene-based copolymer.

CITATION LIST

Patent Literature

Patent Literature 1: JP 2838895 B2
Patent Literature 2: JP 2809721 B2
Patent Literature 3: JP 2882703 B2

SUMMARY OF INVENTION

Technical Problems

As described in Patent Literature 1, however, in the flame retardation method by an inorganic flame retardant, it needs to add 50% by mass or more of an inorganic flame retardant in order to secure desirable flame retardance, and thus there is a concern that roughness of the covering surface or decrease in resin strength may be caused.

In addition, in Patent Literatures 2 and 3, there is a description that the flame retarding effect or heat resistance is improved by covering the outer most layer of a POF with a fluorine-based resin, but in general, melt fracture, which may be the cause of the roughness of a cable appearance, easily occurs in a fluorine-based resin, and thus it is necessary to significantly slow down the covering speed or to raise the molding temperature in order to obtain a cable with favorable appearance. For that reason, there is a concern that the optical properties of a POF may be deteriorated.

Furthermore, for a general POF, a fluorine-based resin is often used as a cladding material, and when a fluorine-based resin is directly covered to the POF as a covering resin, the fluorine-based resin becomes highly adhesive to the POF since the fluorine-based resin is heat fused to the cladding layer of the POF, and thus it is difficult to strip off the jacketing layer. For that reason, it needs to provide an inner jacketing layer of a resin exhibiting low adhesion to a cladding layer between a POF and a fluorine-based resin. However, when the adhesion with a POF is taken into consideration, conversely the adherence with a fluorine-based resin of the jacketing material layer becomes poor, and thus it is difficult to strip off the covering with a commercially available stripper, or it is necessary to thicken the thickness of the inner jacketing layer up to the inner diameter or more of the tooth of the stripper resulting in a complicated control of a cable structure or a complicated production process of a cable.

Solution to Problem

A main object of the invention is to provide a POF cable excellent in flame retardance and processability at the time of use.

The invention relates to a POF cable including a POF and a jacketing layer for covering the POF, in which the jacketing layer comprises of at least two layers of an inner layer and an outer layer, the inner jacketing layer includes a resin comprising a copolymer of olefin and a (meth)acrylic compound, and the outer jacketing layer is constituted by a fluorine-based resin with a fluorine atom content of 50% by mass or more as a main constituent.

Advantageous Effects of Invention

According to the invention, a POF cable not only exhibiting excellent processability at the time of use but also exhibiting high flame retardance may be provided.

DESCRIPTION OF EMBODIMENTS

Hereinafter, a suitable embodiment of the invention will be described.

The POF cable according to an embodiment of the invention includes at least two layers of an inner layer and an outer layer as a jacketing layer for covering a POF, the inner jacketing layer includes a resin comprising a copolymer of olefin and a (meth)acrylic compound, the outer jacketing layer is constituted by a fluorine-based resin as a main constituent, and thus the POF cable is not only exhibiting excellent processability at the time of use but also exhibiting high self-extinguishing and low smoke evolution so that the POF cable of the invention may pass the Steiner tunnel fire test of NFPA 262 regulated by National Fire Protection Association of the United States of America, which requires the highest fire retardancy. For this reason, the POF cable of the invention is suitable for the use in a plenum space (space between the flours or space such as an attic where air constantly flows by air conditioning) of a building such as an office building, an apartment, a hotel, and a hospital, to which high flame retardance is required.

Figure 1:
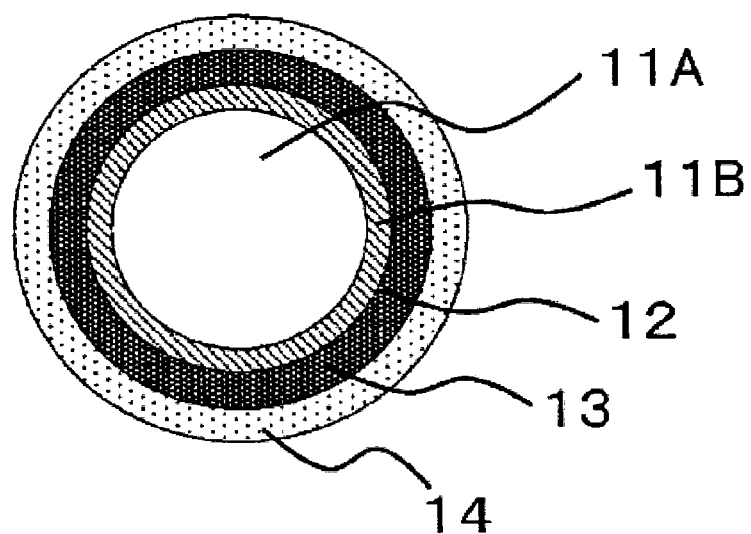
FIG. 1 is a cross sectional diagram illustrating an example of the POF cable of the invention.
Figure 2:
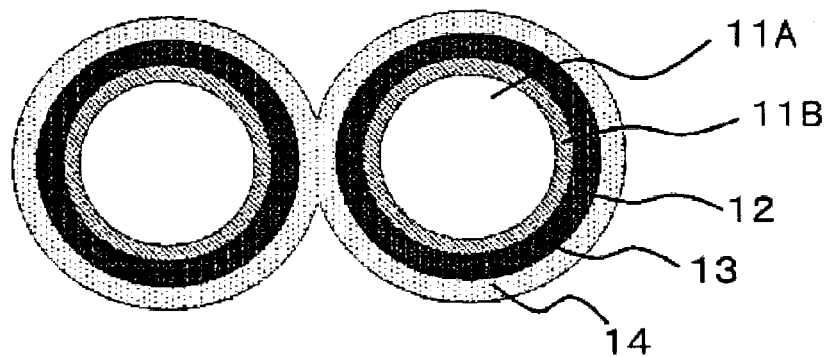
FIG. 2 is a cross sectional diagram illustrating an example of the POF cable according to another embodiment of the invention.

The POF cable according to an embodiment of the invention, as illustrated in FIGS. 1 and 2, includes a POF 12 comprising of a core 11A propagating light and a cladding 11B formed on the periphery of the core, and an inner jacketing layer 13 formed on the periphery of the POF 12 and an outer jacketing layer 14 further formed on the periphery of the inner jacketing layer 13. According to the present embodiment, the POF cable 10 may be a solid wire as exemplified in FIG. 1, or a POF cable bundle of two or more POF cables bundled via a covering material as exemplified in FIG. 2. In addition, a plurality of POFs may be collectively covered by a covering material.

(1) POF (Plastic Optical Fiber)

Here, the POF used in the invention will be described. As a POF 12, a publically known POF may be used in addition to the configurations described in FIGS. 1 and 2. For example, a GI type POF, in which the refractive index of a core 11A is continuously reduced from the center to the periphery, a multilayer POF, in which the refractive index of a core 11A is reduced stepwise from the center to the periphery, a multicore POF, in which a plurality of cores 11A are surrounded by a cladding and then formed into a bundle, and the like may be used. Among them, a multilayer POF may be more preferably used in order to perform high speed signal transmission by widening the bandwidth a POF.

A starting material (core material) used for the core 11A is not particularly limited, and is appropriately selected according to the intended purpose and the like. For example, a polymer with high transparency may be preferably used. As a polymer with high transparency, a polymer including a methacrylate unit is preferable. The examples of such a polymer may include methyl methacrylate homopolymer, a copolymer including a methyl methacrylate unit as the main constituent unit, and a polymer including a fluorinated alkyl methacrylate unit as the main constituent unit. Among these, methyl methacrylate homopolymer and a copolymer including a methyl methacrylate unit as the main constituent unit are preferable. This copolymer may preferably contain 50% by mass or more of methyl methacrylate unit, more preferably contain 60% by mass or more of methyl methacrylate unit, and further preferably contain 70% by mass or more of methyl methacrylate unit. Methyl methacrylate homopolymer is particularly preferable in terms of excellent heat resistance and transparency.

The cladding 11B formed at the periphery of the core 11A may be formed in a single layer or in multilayers of two layers or more. As the starting material (cladding material) constituting the cladding of a POF, a material having a lower refractive index than that of the core material is used. When a methyl methacrylate (MMA)-based polymer is used as the core material, a fluorine-based polymer such as a fluorinated vinylidene-based polymer, a perfluoroalkyl methacrylate-based polymer, methacrylic ester-based polymer, a copolymer of a perfluoroalkyl methacrylate-based compound and a (meth)acrylic compound, and the like may be used as the cladding material.

As the fluorinated vinylidene-based polymer, polyvinylidene fluoride, a copolymer including a vinylidene fluoride unit, for example, vinylidene fluoride-tetrafluoroethylene copolymer, vinylidene fluoride-hexafluoropropylene copolymer, vinylidene fluoride-hexafluoroacetone copolymer, vinylidene fluoride-tetrafluoroethylene-hexafluoropropylene copolymer, vinylidene fluoride-trifluoroethylene copolymer, and a copolymer such as terpolymer or more including vinylidene fluoride unit other than the copolymers described above may be included.

Such a POF may be produced by a common method such as a melting spinning method. In addition, when an optical fiber cable is used under an environment with severe temperature difference, an annealing treatment may be preferably performed by a continuous or batch treatment in order to suppress pistoning.

The diameter of a POF in the invention is not particularly limited, and may be appropriately selected according to the intended purpose. For example, in terms of transmission property, handling property, and the like, the diameter may be preferably set to 500 μm to 1200 μm, more preferably set to 700 μm to 1100 μm, and further preferably set to 750 μm to 1000 μm.

In addition, the thickness of the cladding material of a POF is preferably in a range of 3 to 30 μm, more preferably in a range of 4 to 20 μm, and further preferably in a range of 5 to 15 μm in order to totally reflect the light passing the core part. By setting the thickness of the cladding to 3 μm or more, the light propagating through the core may be easily totally reflected. On the other hand, by setting the thickness of the cladding to 30 μm or less, it is possible to prevent the quantity of light propagated by an optical fiber from being reduced since the diameter of the core is limited according to the thickness of the cladding. In addition, even though the thickness of the cladding is thickened, it is difficult to acknowledge significant improvement in the effect on the propagation of light.

(2) Optical Fiber Cable (It is also Referred to as "POF Cable")

The POF cable of the invention includes the POF described above and a jacketing layer for covering the POF as the essential constituents. The jacketing layer includes at least two layers of an inner layer (inner jacketing layer) and an outer layer (outer jacketing layer). Another layer other than the two layers may also be included.

The inventors, by focusing on the point that the adhesion between a fluorine-based resin including a unit such as vinylidene fluoride, and a (meth)acrylic compound is favorable, and by using a copolymer of olefin and a (meth)acrylic compound as the inner jacketing layer, and a fluorine-based resin including 50% by mass or more of a fluorine atom as the main constituent of the outer jacketing layer, have found that the covering resin is easily stripped off with a commercially available stripper while maintaining high flame retardance.

Here, it is particularly advantageous that the inner jacketing layer has appropriate adhesion with the outer jacketing layer. The reason is because that when stripping the jacketing layer with a commercially available stripper, if the jacketing layer of the inner layer and the outer layer may be stripped off at once, time and cost may be saved.

(2-1) Inner Jacketing Layer

The inner jacketing layer of the optical fiber cable according to the invention includes a resin comprising a copolymer of olefin and a (meth)acrylic compound.

The inner layer may also include a resin other than the resin comprising a copolymer of olefin and a (meth)acrylic compound, and also, a pigment or a flame retardant to be described below may also be added in the inner layer. With respect to the total mass of the resins included in the inner layer, the copolymer of olefin and a (meth)acrylic compound is preferably included in amount of at least 70% by mass, and further preferably 90% by mass or more, and further may be 100% by mass.

In addition, with respect to the total mass of the inner layer, at least to secure sufficient adhesion with the POF, the content of the resin comprising a copolymer of olefin and a (meth) acrylic compound is preferably 45% by mass or more, further preferably 47% by mass or more and more preferably 50% by mass or more.

The kind of olefin is not particularly limited as long as the desired effect is obtained. In the invention, a straight chain olefin may be used and an olefin with a branched chain may also be used. Among the olefins, a preferred compound is, for example, an alkene having 2 to 6 carbon atoms. As an alkene as well, a straight chain alkene may be used and an alkene with a branched chain may also be used. In more detail, ethylene, propylene, 1-butene, 2-butene, isobutene, 1-pentene, cis-2-pentene, trans-2-pentene, hex-1-ene, hex-2-ene, hex-3-ene, and the like may be exemplified. Among these, ethylene is particularly preferable.

A (meth)acrylic compound is not also limited, and not only a (meth)acrylic acid compound is included but also a (meth) acrylic ester compound and (meth)acrylic acid amide are included. The examples of the (meth)acrylic acid compound may include acrylic acid and methacrylic acid. The examples of the (meth)acrylic ester compound may include methyl acrylate, methyl methacrylate, ethyl acrylate, ethyl methacrylate, butyl acrylate, butyl methacrylate, and the like. The examples of the (meth)acrylic acid amide may include acrylic acid amide and methacrylic acid amide. Among these, acrylic acid, ethyl acrylate, butyl acrylate, and the like are preferable.

As the copolymer comprising olefin and a (meth)acrylic compound used in the invention, for example, an ethylene-acrylic acid copolymer, an ethylene-ethyl acrylate copolymer, an ethylene-ethyl methacrylate copolymer, an ethylene-methyl acrylate copolymer, an ethylene-methacrylic acid copolymer, an ethylene-methyl methacrylate copolymer, an ethylene-butyl acrylate copolymer, an ethylene-butyl methacrylate copolymer, and the like may be included. Among these, in terms of processability or heat resistance, an ethylene-ethyl acrylate copolymer, an ethylene-acrylic acid copolymer, an ethylene-butyl acrylate copolymer, and the like are preferable.

The content of the (meth)acrylic compound unit in the copolymer of olefin and a (meth)acrylic compound is not particularly limited, but is preferably 5 to 40% by mass, more preferably 10 to 38% by mass, and further preferably 15 to 35% by mass.

By setting the content of the (meth)acrylic compound unit to 5% by mass or more, the adhesion with the fluorine-based resin of the outer jacketing layer may become stronger, and thus collective stripping of the covering material with a wire stripper may be easily performed.

In addition, by setting the content of the (meth)acrylic compound unit to 40% by mass or less, it may be prevented that the adhesion between the inner jacketing layer and the POF becomes too strong and thus collective stripping of the fluorine-based resin of the outer jacketing layer with a wire stripper becomes difficult.

Meanwhile, to the inner jacketing layer, for the purpose of imparting a function to prevent the light from leaking from the POF to the jacketing layer or to prevent the light from the outside from entering to the inside of the POF, a black pigment such as carbon black may be added. The addition amount thereof is not particularly limited, and, for example, with respect to the total mass of the resin constituting the inner jacketing layer, 0.15 to 5% by mass, more preferably 0.2 to 2.5% by mass, and further preferably 0.3 to 1.5% by mass may be added. By adding 0.15% by mass or more, it is possible to suppress the entering of the light from the outside into the POF, and thus the POF may be used without damaging the stability of communication that is the primary purpose of the POF utilization. By adding 5% by mass or less, even when the POF is constructed in a bent state, it is possible to suppress the leakage of light from the bent part.

In addition, for the purpose of improving the flame retardance, a metal hydroxide such as magnesium hydroxide or aluminum hydroxide; a phosphorus compound such as red phosphorus and an organic phosphoric acid compound; and a nitrogen-based flame retardant such as melamine cyanurate may be added. The addition amount of these additives is not particularly limited as long as the addition amount is in the range that does not damage the desired properties according to the invention.

For example, in a case of a metal hydroxide, the addition amount may be 15 to 50% by mass, more preferably 20 to 48% by mass, and further preferably 20 to 45% by mass with respect to the total amount of the inner jacketing layer. In a case of a phosphorus compound, the addition amount may be 1 to 10% by mass, more preferably 2 to 8% by mass, and further preferably 3 to 7% by mass with respect to the total amount of the inner jacketing layer. In a case of a nitrogen-based flame retardant, the addition amount may be 10 to 50% by mass, more preferably 15 to 45% by mass, and further preferably 20 to 40% by mass with respect to the total amount of the inner jacketing layer.

One kind of these compounds may be used independently, or two kinds or more thereof may be used in combination. When two kinds or more thereof are used in combination, for example, two kinds or more out of the metal hydroxides (the same kind of flame retardant) may be combined, or different kinds of flame retardants, for example, a metal hydroxide and a phosphorus compound may be combined and used.

Among these, particularly, the combination of magnesium hydroxide and red phosphorus exhibits high self-extinguishing due to synergistic effect thereof, and when 10 to 50% by mass of magnesium hydroxide with respect to the total amount of the inner jacketing layer is added and 1 to 10% by mass of red phosphorus with respect to the total amount of the inner jacketing layer is added, high flame retardance may be exhibited, and thus it is significantly preferable.

(2-2) Outer Jacketing Layer (2-2-1) Fluorine-based Resin

Next, the resin of the outer jacketing layer used in the invention will be described. As the resin of the outer jacketing layer, as described above, a resin having a favorable adhesion with the copolymer comprising olefin and a (meth)acrylic compound of the inner jacketing layer, and capable of imparting sufficient flame retardance to the optical fiber cable is used.

As such a resin, a fluorine-based resin with a fluorine atom content of 50% by mass or more is used. The outer jacketing layer in the invention is constituted by a fluorine-based resin with a fluorine atom content of 50% by mass or more as the main constituent. The inclusion as the main constituent means that the fluorine-based resin with a fluorine atom content of 50% by mass or more is included in the amount of 50% by mass or more with respect to the total mass of the outer layer. The fluorine-based resin is preferably 70% by mass or more, and more preferably 80% by mass or more with respect to the total mass of the outer layer.

Here, for the content of the fluorine atom included in the fluorine-based resin, the content of the fluorine atom included in a repeating unit constituting a polymer chain is defined as the fluorine content. It is significantly preferable to have the fluorine atom content of 50% by mass or more since high flame retardance enough to pass the Steiner tunnel fire test to be described below is exhibited. The content of the fluorine atom is more preferably 53% by mass or more and further preferably 55% by mass.

Among these, particularly, a fluorine-based resin including a vinylidene fluoride unit is preferable. By using a fluorine-based resin including a vinylidene fluoride, it may be prevented that the melting temperature of the resin becomes too high, and thus the covering of a POF is easily performed. In addition, since adhesive effect with the copolymer comprising olefin and a (meth)acrylic compound described above is obtained, it is preferable.

The fluorine-based resin including a vinylidene fluoride unit is not particularly limited, and a vinylidene fluoride-trifluoroethylene-based copolymer (2F-3F), a vinylidene fluoride-tetrafluoroethylene-based copolymer (2F-4F), a vinylidene fluoride-hexafluoropropylene-based copolymer (2F-6F), a vinylidene fluoride-tetrafluoroethylene-hexafluoropropylene-based copolymer (2F-4F-6F), a vinylidene fluoride-chlorotrifluoroethylene-based copolymer (2F-3FCl), and the like may be exemplified.

Among these, in terms of low melt viscosity and easy processing, a vinylidene fluoride-hexafluoropropylene-based copolymer, a vinylidene fluoride-chlorotrifluoroethylene-based copolymer, and a vinylidene fluoride-tetrafluoroethylene-based copolymer are preferable.

One kind of the resins exemplified above may be used independently, or two kinds or more of the resins may be used in combination. In addition, these resins may be a copolymer including another constituent in the molecular chain thereof, or a copolymer having a side chain grafted with another constituent.

(2-2-2) Surface Modifier

These fluorine-based resins exhibit high flame retardance, but, as described above, among fluorine-based resins, there are some resins, in which melt fracture that is the cause of the roughness of cable appearance easily occurs, and of which moldability is significantly poor, and there are also some resins, which need to be melt at a high temperature of 230° C. or higher in some cases, and thus, the resins may not be used as they are as a cable material of a POF. For that reason, a surface modifier is preferably added to a fluorine-based resin.

The MFR (230° C., 21.2 N) defined in JIS K7210-1999 of a fluorine-based resin added with a surface modifier is preferably 3 to 50 g/10 min, more preferably 3.5 to 45 g/10 min, and further preferably 4 to 40 g/10 min. By adjusting the MFR to 3 g/10 min or more, when a cable is produced by covering a resin to a POF, the pressure from the resin to the POF strand may be reduced and thus a desired POF cable may be produced without damaging the optical properties of the POF. In addition, by adjusting the MFR to 50 g/10 min or less, it is possible to improve the processability of the resin is improved and thus to suppress the occurrence of melt fracture at the production speed of a POF cable.

As such a surface modifier, a resin having excellent compatibility with a fluorine-based resin including a vinylidene fluoride unit and high fluidity so as to have a MFR (230° C., 21.2 N) defined in JIS K7210-1999 in a range of preferably 5 to 500 g/10 min, more preferably 7 to 400 g/10 min, and further preferably 10 to 300 g/10 min may be preferably used. As such a resin, for example, an acrylic resin such as polymethyl methacrylate and poly-t-butyl methacrylate, or a copolymer thereof, or a polyamide-based resin such as polyamide 12, polyamide 612, and polyamide 11, or a copolymer thereof, and the like may be preferably used.

Among these surface modifiers, as an acrylic resin, polymethyl methacrylate, and as a polyamide-based resin, polyamide 12 and polyamide 11 are particularly preferable since these resins exhibit particularly excellent fluidity and favorable compatibility with the fluorine-based resin. In a case of using an acrylic resin, a low molecular weight resin having a number average molecular weight of about 10000 to 50000, more preferably 15000 to 45000, and further preferably 20000 to 40000 is preferable since the fluidity thereof is high.

The content of the surface modifier is not particularly limited, but is preferably 0.5 to 20% by mass, more preferably 5 to 17% by mass, and further preferably 7 to 15% by mass with respect to the total amount of the outer jacketing layer. By setting the content of the surface modifier to 0.5% by mass or more, sufficient effect as a surface modifier may be obtained and the occurrence of melt fracture due to a fluorine-based resin at the time of covering may be suppressed. By setting the content of the surface modifier to 20% by mass or less, sufficient flame retardance may be obtained and the moldability or appearance of the POF cable may be improved as well.

(2-2-3) Additives and the Like

Meanwhile, to this outer jacketing layer, for the purpose of increasing discriminability and designability, an additive may be added in the range of not damaging the properties of the outer jacketing layer. The kind of the additive is not particularly limited, and may be appropriately selected according to the purpose, and a pigment may be preferably used.

As a pigment, the kind thereof is not limited and a publically known pigment may be used. For example, an inorganic pigment or an organic pigment may be used. For example, as a black pigment, carbon black, triiron tetraoxide, or the like, as a white pigment, titanium dioxide, zinc oxide, and the like, as a yellow pigment, an azo organic pigment, chromate of lead, chrome yellow, zinc yellow, and the like, as a blue pigment, ultramarine blue, cobalt blue, and the like, and as a green pigment, chromium oxide, cobalt green, and the like may be included. Among these, particularly, as a black pigment, carbon black is preferable in terms of contrast ratio. In addition, as a white pigment, titanium dioxide or zinc oxide is preferable, and in terms of contrast ratio and tinting strength, titanium dioxide is particularly preferable. In addition, as a blue pigment, ultramarine blue, and as a green pigment, chromium oxide are particularly preferable in terms of contrast ratio and tinting strength.

The content of a pigment is not particularly limited as long as the effect obtained from the outer jacketing layer according to the invention is not impaired, and may be, for example, 0.5 to 10% by mass, more preferably 1 to 7% by mass, and further preferably 3 to 6% by mass with respect to the total amount of the outer jacketing layer. Since the pigment is to color the outer layer and to impart discriminability and designability to the POF cable, by containing the pigment in the amount of 0.5% by mass or more, a desired color may be developed and thus discriminability may be improved. By setting the addition amount to 10% by mass or less, decrease in the mechanical strength of the cable and deterioration in the optical properties due to the pigment migration to the inside of the POF may be avoided.

(2-2-4) POF Cable

The POF cable produced in this manner has an outer diameter of 1.5 mm or 2.2 mm in many cases. When considering that the outer diameter of a general POF is 1.0 mm, in a case of a POF cable with a diameter of 1.5 mm, since the thickness of the jacketing layer is about 0.25 mm, the thickness of the inner jacketing layer is preferably 0.1 mm and the thickness of the outer jacketing layer is preferably about 0.15 mm. In addition, in a case of a POF cable with a diameter of 2.2 mm, since the thickness of the jacketing layer is about 0.6 mm, the thickness of the inner jacketing layer is preferably 0.25 mm and the thickness of the outer jacketing layer is preferably about 0.35 mm. By composing the thickness proportion of the inner jacketing layer and the outer jacketing layer as described above, a desired flame retarding effect may be obtained.

Meanwhile, the thickness of the inner jacketing layer is preferably a thickness that may suppress entering the light from the outside and leaking the light for communication when the POF cable is constructed in a bent state, and in order to obtain sufficient light leakage effect for this, favorable flame retardance, and designability (color tone) as a cable, the thickness ratio of the inner jacketing layer and the outer jacketing layer (inner jacketing layer:outer jacketing layer) is preferably in a range of 50:50 to 15:85.

In a case of 2.2 mm, which is the outer diameter of the general POF cable described above, since the thickness of the jacketing layer is 0.6 mm (600 μm), the thickness of the inner jacketing layer is preferably in a range of 90 to 300 μm, and the thickness of the outer jacketing layer is preferably in a range of 300 to 510 μm, in addition, the thicknesses of the inner jacketing layer and the outer jacketing layer are further preferably in a range of 150 to 270 μm and 330 to 450 μm, respectively, and the most preferable range is that the thickness of the inner jacketing layer is 240 to 264 μm, and the thickness of the outer jacketing layer is 336 to 360 μm. These correspond to the thickness ratio of the inner jacketing layer and the outer jacketing layer of 50:50 to 15:85, 25:75 to 45:55, and 40:60 to 44:56, respectively.

When the thickness of the inner jacketing layer is 15% or more with respect to the thickness of the jacketing layer (the thickness of the outer jacketing layer is 85% or less with respect to the thickness of the jacketing layer), flame retardance enough to pass the Steiner tunnel fire test may be secured and a POF cable with a desired designability may be obtained. When the thickness of the inner jacketing layer is 50% or less with respect to the thickness of the jacketing layer (the thickness of the outer jacketing layer is 50% or more with respect to the thickness of the jacketing layer), the POF cable may be used without damaging the stability of communication that is the primary purpose of the POF utilization while securing sufficient flame retardance.

The POF cable of the invention exhibits flame ratardance satisfying the Steiner tunnel fire test of National Fire Protection Association (NFPA) standard 262. The NFPA standard 262 is a standard of a fire test using a Steiner tunnel test apparatus regulated by National Fire Protection Association of the United States of America, and is a test requiring the highest flame retardancy under the present circumstances. The fire test is performed in a state of that a cable specimen is spread all over the length of the Steiner tunnel test apparatus (a cable tray with a length of about 7 m and a width of about 0.3 m is installed in the test furnace with a total length of about 8 m) installed in the test room controlled with temperature, humidity, and indoor pressure, and flame spread and smoke evolution are evaluated. According to the embodiment of the POF cable of the invention, the POF cable may pass the Steiner tunnel fire test.

Finally, the method for producing the POF cable of the invention will be described.

When the POF cable having the configuration of the invention is produced, in the covering process to impart a jacketing layer to the POF, the covering of the POF may be performed using an extrusion covering apparatus equipped with a crosshead die. The POF cable of the invention may be produced by forming the inner jacketing layer using a crosshead equipped with a die and a nipple and then forming the outer jacketing layer by batch process, or by collectively covering the two layers using a crosshead equipped with dies and nipples in two-stages.

Next, another embodiment of the invention will be described with reference to FIG. 2.

FIG. 2 is a cross sectional diagram of a POF cable with two cores in parallel, and outer jacketing layers 14 of two POF cables are coupled in FIG. 2. In order to produce a POF cable with such a configuration, for example, an inner jacketing layer 13 is formed on the periphery of a POF 12 using an extrusion covering apparatus equipped with a crosshead die and then the outer jacketing layer 14 is covered by a batch process using a crosshead equipped with a die/nipple for two cores, thereby obtaining the POF cable.

When a POF cable is used for a communication application, in general, one end of the POF cable needs to be connected to the light source system and the other end needs to be connected to a light receiving system. At that time, when bidirectional communication is performed, by using two POF cables so that each of these light source and light receiving systems is complete, bidirectional communication may be easily performed. Hence, a POF cable with two cores as illustrated in FIG. 2 may be produced using two POFs.

EXAMPLES

Hereinafter, the invention will be described with reference to Examples, but the scope of the invention is not limited to these Examples. Respective evaluation methods in Examples are as follows.

[Steiner Tunnel Fire Test]

For the evaluation of the flame retardance of a POF cable, a fire test was performed on the basis of the Steiner tunnel fire test of National fire Protection Association (NFPA) 262. The required number of POF cables (about 203 cables for the POF cable of 1.5 mm, and about 138 cables for the POF cable of 2.2 mm) were laid on the horizontal tray of the apparatus, and burned for 20 minutes using a prescribed gas burner. When the maximum flame was not spread to 5 ft or higher from the tip of the flame of the gas burner, the maximum peak value of the optical density was 0.5 or less and the maximum average value of the optical density was 0.15 or less, it was considered to pass the test.

[Transmission Loss]

Transmission loss (dB/km) was measured by a 25 m-5 m cutback method. Light with a wavelength for measurement of 650 nm and an NA (numerical aperture) of the incident light of 0.1 was used.

[Stripping Property of Covering Resin]

The extent of the adherence between the inner jacketing layer and the outer jacketing layer was evaluated using a commercially available wire stripper 3000B (manufactured by VESSEL CO., INC.). For the POF cable produced using a POF strand with an outer diameter of 1.0 mm, blades for 1.2 mm were used as the blades of the cable stripping part of the wire stripper. This is because if blades for 1.0 mm were used as the blades of stripping part, there is a concern to scratch the cladding part of the POF at the time of stripping the covering. Therefore, it needs to use stripping blades a little larger than the outer diameter of a POF as the blades of a wire stripper. In addition, for the same reason, for the POF cable produced using a POF strand of 0.75 mm, the blades for 1.0 mm were used as the blades of the cable stripping part of the wire stripper. When the inner jacketing layer and the outer jacketing layer were easily stripped off at once, it was considered to pass the test (it is indicated as "O" in Tables), and when only the outer jacketing layer was stripped off, it was not considered to pass the test (it is indicated as "X").

[Appearance]

The appearance of the POF cable produced was determined as follows. The state of the appearance and the presence or absence of surface variation of a 1000 m cable were visually measured using an outer diameter variation detector (model: TM-1000XY) manufactured by Takikawa Engineering Co., Ltd. The measurement condition of the cable was set such that the variation of ±40 μm or more may be detected. The smooth POF cable without surface roughness such as melt fracture and without particles or lumps (the POF cable, in which the variation was not detected by the variation detector) was considered to pass the test (it is indicated as "0" in Tables), and the POF cable, in which surface roughness occurred, or the POF cable, in which the variation was detected by the variation detector, was not considered to pass the test (it is indicated as "X" in Tables).

Example 1

As the core material and the cladding material, a homopolymer (PMMA) of methyl methacrylate (MMA) and a copolymer of vinylidene fluoride (2F)/tetrafluoroethylene (4F) of 80/20 (mol %) were used, respectively. These materials were melted and spun by sequentially laminating to a concentric circular form from the center, thereby obtaining a POF with a core diameter of 980 μm, a cladding thickness of 10 μm, and an outer diameter of 1.0 mm.

Subsequently, as the inner jacketing layer, the material obtained by containing carbon black in ethylene-ethyl acrylate copolymer (EEA resin) containing 20% by mass of ethyl acrylate unit in the amount of 0.45% by mass with respect to the EEA resin was used. In addition, as the outer jacketing layer, the material obtained by adding, as a surface modifier, polymethyl methacrylate (Trade name: Acrypet TF9 manufactured by Mitsubishi Rayon Co., Ltd.) with a MFR (230° C., 21.2 N) defined in JIS K7210-1999 of 10.75 g/10 min to vinylidene fluoride (2F)/hexafluoropropylene (6F) of 85/15 (mol %) (Trade name: KYNAR Flex 2500-20 manufactured by ARKEMA K. K.; the content of fluorine atom: 61.0% by mass; MFR (230° C., 21.2 N): 2.90 g/10 min) in the amount of 10% by mass was used. The MFR (230° C., 21.2 N: JIS K7210-1999) of the resin after addition of the surface modifier was 3.73 g/10 min. In addition, in order to color the outer jacketing layer, the material containing zinc oxide of 5% by mass as a color pigment was used.

These were supplied to a crosshead type covering apparatus for resin covering, and the periphery of the POF was sequentially covered with both the covering materials, thereby obtaining a POF cable with an outer diameter of 1.5 mm. At that time, the thickness of the inner jacketing layer was 100 μm and the thickness of the outer jacketing layer was 150 μm. The POF cable thus obtained was subjected to the Steiner tunnel fire test to perform evaluation on the extent of combustion and smoke evolution. In addition, in order to evaluate the processability and designability of the POF cable, the evaluation on the collective stripping property and appearance of the inner jacketing layer and the outer jacketing layer was performed. The results are collectively listed in Table 2. As can be known from Table 2, except flame retardance, the POF cable of Example 1 is also significantly excellent in stripping property of the covering materials and the appearance.

Example 2

A POF cable with an outer diameter of 1.5 mm was obtained in the same manner as in Example 1, except using a material having a MFR of the resin of 8.51 g/10 min after the addition of the surface modifier. Here, vinylidene fluoride (2F)/tetrafluoroethylene (4F)/hexafluoropropylene (6F) of 60/35/5 (mol %) (Trade name: Dyneon THV220G manufactured by Sumitomo 3M Ltd.; the content of fluorine atom: 69.5% by mass; MFR (230° C., 21.2 N): 7.03 g/10 min) was used as a fluorine-based resin as the resin used for the outer jacketing layer, and, as a surface modifier, polyamide 12 (Trade name: Daiamid L1640 manufactured by Daicel-Evonik Ltd.) with a MFR (230° C., 21.2 N) of 84 g/10 min was added in the amount of 10% by mass with respect to the resin. The respective evaluation results of the POF cable thus obtained are listed in Table 2.

Example 3

A POF cable with an outer diameter of 2.2 mm was obtained in the same manner as in Example 1, except that the fluorine-based resin used for the outer jacketing layer was changed to vinylidene fluoride (2F)-tetrafluoroethylene (4F) copolymer (Trade name: Neoflon VP-50 manufactured by Daikin Industries, Ltd.; the content of fluorine atom: 62.7% by mass; MFR (230° C., 21.2 N): 10.65 g/10 min); as a surface modifier, the polyamide 12 used in Example 2 was added in the amount of 5% by mass with respect to the resin; then, as a color pigment, carbon black was added to the resin including a MFR of 12.05 g/10 min in the amount of 1% by mass with respect to the resin. At that time, the thickness of the inner jacketing layer was 250 μm and the thickness of the outer jacketing layer was 350 μm. The respective evaluation results of the POF cable thus obtained are listed in Table 2.

Example 4

A POF cable with an outer diameter of 2.2 mm was obtained in the same manner as in Example 3, except that, as the inner jacketing layer, the resin composition obtained by adding, as a flame retardant, magnesium hydroxide and red phosphorus to ethylene-ethyl acrylate copolymer (ethyl acrylate unit: 35% by mass) in the amounts of 45% by mass and 5% by mass with respect to the total mass of the inner layer, respectively, was used, and as the outer jacketing layer, the material obtained by adding, as a surface modifier, polyamide 12 to a vinylidene fluoride (2F)-chlorotrifluoroethylene (3F)-based copolymer of 80/20 (mol %) (Trade name: CEFRAL SOFT G150 manufactured by Central Glass Co., Ltd.; the content of fluorine atom: 56.8% by mass; MFR (230° C., 21.2 N): 5.76 g/10 min) in the amount of 10% by mass with respect to the resin, and adding, as a color pigment, titanium dioxide to the resin including a MFR of 7.32 g/10 min in the amount of 5% by mass with respect to the resin was used. The respective evaluation results of the POF cable thus obtained are listed in Table 2.

Example 5

A POF cable with an outer diameter of 1.5 mm (the thickness of the inner jacketing layer was 100 μm and the thickness of the outer jacketing layer was 150 μm) was obtained in the same manner as in Example 4, except that the surface modifier used for the outer jacketing layer was changed to polymethyl methacrylate used in Example 1, and the MFR of the resin after addition of the surface modifier was 6.46 g/10 min. The respective evaluation results of the POF cable thus obtained are listed in Table 2.

Comparative Example 1

A POF cable with an outer diameter of 1.5 mm was obtained in the same manner as in Example 1, except that a low density polyethylene (PE, Trade name: UBE C180 manufactured by Ube Maruzen Co., Ltd.; MFR (230° C., 21.2 N): 0.68 g/10 min) was used for the inner jacketing layer and the outer jacketing layer, and the resin composition obtained by containing, as a flame retardant, magnesium hydroxide and red phosphorus in the resin in the amounts of 60% by mass and 5% by mass, respectively, was used as the inner layer. The POF cable thus obtained was poor in flame retardance and was not possible to pass the Steiner tunnel fire test.

Comparative Example 2

A POF cable with an outer diameter of 1.5 mm was obtained in the same manner as in Example 1, except that vinyl chloride resin (PVC, Trade name: kanevinyl 51003 manufactured by Kaneka Corporation) was used for the inner jacketing layer and the outer jacketing layer, and a PVC compound obtained by adding, as a flame retardant, aluminum hydroxide and antimony trioxide in the amounts of 10% by mass and 2% by mass, respectively, was used. The POF cable thus obtained was subjected to the fire test, and as a result, the self-extinguishing of the resin itself was high but a large amount of smoke was emitted at the time of combustion. Therefore, it was not possible to pass the Steiner tunnel fire test.

Comparative Example 3

A POF cable was obtained in the same manner as in Example 4, except that the PVC used in Comparative Example 2 was used for the inner jacketing layer. The appearance of the POF cable thus obtained was favorable and the flame retardance thereof was excellent. However, it was not possible to pass the Steiner tunnel fire test since the smoke evolution (maximum value of optical density) at the time of combustion exceeded the standard value of 0.5. In addition, the stripping property (adhesion between the inner jacketing layer and the outer jacketing layer) of the jacketing layer was poor and thus it was not possible to strip off the jacketing layer with a commercially available wire stripper at once.

Comparative Example 4

A POF cable was obtained in the same manner as in Example 1, except that a vinylidene fluoride (2F)/hexafluoropropylene (6F)-based resin was used for the inner jacketing layer, and ethylene-ethyl acrylate copolymer (MFR (230° C., 21.2 N): 0.93 g/10 min) containing 20% by mass of ethyl acrylate unit was used for the outer jacketing layer. The POF cable thus obtained was not possible to pass the Steiner tunnel fire test since the maximum flame of the flame at the time of combustion exceeded the standard of 5 ft. In addition, since a fluorine-based resin was used for the inner jacketing layer, the adhesion with the POF was too strong and thus it was not possible to strip off the jacketing layer with a commercially available wire stripper.

Example 6

A POF cable was obtained in the same manner as in Example 1, except that a POF cable with an outer diameter of 1.5 mm was produced using a POF strand with an outer diameter of 0.75 mm and by changing the thickness of the inner jacketing layer and the thickness of the outer jacketing layer to the values listed in Table 3. The results of evaluations are listed in Table 3.

Example 7

A POF cable was obtained in the same manner as in Example 4, except that a POF cable with an outer diameter of 1.5 mm was produced using a POF strand with an outer diameter of 0.75 mm and by changing the thickness of the inner jacketing layer and the thickness of the outer jacketing layer to the values listed in Table 3. The results of evaluations are listed in Table 3.

Example 8

A POF cable was obtained in the same manner as in Example 4, except using a POF strand with an outer diameter of 1.0 mm and changing the thicknesses of the inner jacketing layer and the thickness of the outer jacketing layer to the values listed in Table 3. The results of evaluations are listed in Table 3.

Example 9

A POF cable was obtained in the same manner as in Example 4, except using a POF strand with an outer diameter of 1.0 mm and using ethylene-ethyl acrylate copolymer (ethyl acrylate unit: 20% by mass) as the inner jacketing layer. The results of evaluations are listed in Table 3.

Examples 10 and 11

POF cables were obtained in the same manner as in Example 4, except that the POF cables with an outer diameter of 2.2 mm were produced using a POF strand with an outer diameter of 1.0 mm and by changing the thickness of the inner jacketing layer and the thickness of the outer jacketing layer to the values listed in Table 3. The results of evaluations are listed in Table 3.

Examples 12 and 13

POF cables were obtained in the same manner as in Example 1, except that the POF cables with an outer diameter of 2.2 mm were produced using a POF strand with an outer diameter of 1.0 mm and changing the thickness of the inner jacketing layer and the thickness of the outer jacketing layer to the values listed in Table 3. The results of evaluations are listed in Table 3.

TABLE 1

| | | INNER JACKETING LAYER | | | OUTER JACKETING LAYER | | |
|---|---|---|---|---|---|---|---|
| | OUTER DIAMETER OF POF [mm] | RESIN | FLAME RETARDANT | PIGMENT | THICKNESS [mm] | RESIN | CONTENT OF FLUORINE ATOM [% BY MASS] | MFR* OF BASE RESIN [g/10 min] |
| Example 1 | 1.0 | EEA 1 | — | 0.45% BY MASS OF CARBON BLACK | 100 | 2F/6F | 61.0 | 2.90 |
| Example 2 | 1.0 | EEA 1 | — | 0.45% BY MASS OF CARBON BLACK | 100 | 2F/4F/6F | 69.5 | 7.03 |
| Example 3 | 1.0 | EEA 1 | — | 0.45% BY MASS OF CARBON BLACK | 250 | 2F/4F | 62.7 | 10.65 |
| Example 4 | 1.0 | EEA 2 | Mg(OH)$_2$/RED PHOSPHORUS =45/5 [% BY MASS] | 0.45% BY MASS OF CARBON BLACK | 250 | 2F/3FCl | 56.8 | 5.76 |
| Example 5 | 1.0 | EEA 2 | Mg(OH)$_2$/RED PHOSPHORUS =45/5 [% BY MASS] | 0.45% BY MASS OF CARBON BLACK | 100 | 2F/3FCl | 56.8 | 5.76 |
| Comparative Example 1 | 1.0 | PE | Mg(OH)$_2$/RED PHOSPHORUS =60/5 [% By MASS] | 0.45% BY MASS OF CARBON BLACK | 100 | PE | — | 0.69 |
| Comparative Example 2 | 1.0 | PVC | Al(OH)$_3$/Sb$_2$O$_3$ =10/2 [% BY MASS] | 0.45% BY MASS OF CARBON BLACK | 100 | PVC | — | UNMEASURABLE DUE TO THERMAL DECOMPOSITION |
| Comparative Example 3 | 1.0 | PVC | Al(OH)$_3$/Sb$_2$O$_3$ =10/2 [% BY MASS] | 0.45% BY MASS OF CARBON BLACK | 350 | 2F/3FCl | 56.8 | 5.76 |
| Comparative Example 4 | 1.0 | 2F/6F | — | 0.45% BY MASS OF CARBON BLACK | 100 | EEA 1 | — | 0.93 |

| | OUTER JACKETING LAYER | | | | | |
|---|---|---|---|---|---|---|
| | SURFACE MODIFIER | MFR* OF SURFACE MODIFIER [g/10 min] | FLAME RETARDANT | PIGMENT | THICKNESS [mm] | MFR* AFTER MODIFICATION OF FLUIDITY [g/10 min] | OUTER DIAMETER OF CABLE [mm] |
| Example 1 | 10% BY MASS OF PMMA | 10.75 | — | 5% BY MASS OF ZINC OXIDE | 150 | 3.73 | 1.5 |
| Example 2 | 10% BY MASS OF PA 12 | 84 | — | 5% BY MASS OF ZINC OXIDE | 150 | 8.51 | 1.5 |
| Example 3 | 5% BY MASS OF PA 12 | 84 | — | 1% BY MASS OF CARBON BLACK | 350 | 12.05 | 2.2 |
| Example 4 | 10% BY MASS OF PA 12 | 84 | — | 5% BY MASS OF TITANIUM DIOXIDE | 350 | 7.32 | 2.2 |

TABLE 1-continued

|  | | | | | | | |
|---|---|---|---|---|---|---|---|
| Example 5 | 10% BY MASS OF PMMA | 10.75 | — | 5% BY MASS OF ZINC OXIDE | 150 | 6.46 | 1.5 |
| Comparative Example 1 | — | — | Mg(OH)$_2$/RED PHOSPHORUS =60/5 [% BY MASS] | 5% BY MASS OF TITANIUM DIOXIDE | 150 | — | 1.5 |
| Comparative Example 2 | — | — | Al(OH)$_3$/Sb$_2$O$_3$ =10/2 [% BY MASS] | 0.45% BY MASS OF CARBON BLACK | 150 | — | 1.5 |
| Comparative Example 3 | 10% BY MASS OF PA 12 | 84 | — | 5% BY MASS OF TITANIUM DIOXIDE | 350 | 7.32 | 2.2 |
| Comparative Example 4 | — | — | — | 5% BY MASS OF ZINC OXIDE | 150 | — | 1.5 |

IN THE TABLE, THE ABBREVIATIONS OF COMPOUNDS INDICATE THE FOLLOWING COMPOUNDS, RESPECTIVELY.
EEA 1: ETHYLENE-ETHYL ACRYLATE COPOLYMER (20% BY MASS OF ETHYL ACRYLATE UNIT)
EEA 2: ETHYLENE-ETHYL ACRYLATE COPOLYMER (35% BY MASS OF ETHYL ACRYLATE UNIT)
2F/6F: VINYLIDENE FLUORIDE/HEXAFLUOROPROPYLENE COPOLYMER (85/15 [% BY MOLE])
2F/4F: VINYLIDENE FLUORIDE/TETRAFLUOROETHYLENE COPOLYMER (80/20 [% BY MOLE])
2F/3FCL: VINYLIDENE FLUORIDE/CHLOROTRIFLUOROETHYLENE COPOLYMER (80/20 [% BY MOLE])
2F/4F/6F: VINYLIDENE FLUORIDE/TETRAFLUOROPROPYLENE/HEXAFLUOROETHYLENE COPOLYMER (60/35/5 [% BY MOLE])

TABLE 2

|  | STEINER TUNNEL FIRE TEST | | | | | |
|---|---|---|---|---|---|---|
|  | MAXIMUM FLAME [<5 ft] | OPTICAL DENSITY (MAXIMUM VALUE) [<0.5] | OPTICAL DENSITY (AVERAGE VALUE) [<0.15] | PASS OR FAIL | STRIPPING PROPERTY OF COVERING | APPEARANCE |
| Example 1 | 0.6 ft | 0.07 | 0.03 | O | O | O |
| Example 2 | 0.6 ft | 0.02 | 0.01 | O | O | O |
| Example 3 | 0.6 ft | 0.21 | 0.04 | O | O | O |
| Example 4 | 0.6 ft | 0.20 | 0.01 | O | O | O |
| Example 5 | 0.6 ft | 0.11 | 0.04 | O | O | O |
| Comparative Example 1 | 19.3 ft | 1.20 | 0.11 | X | O | O |
| Comparative Example 2 | 1.0 ft | 0.99 | 0.14 | X | O | O |
| Comparative Example 3 | 0.6 ft | 0.54 | 0.03 | X | O | O |
| Comparative Example 4 | 5.5 ft | 0.40 | 0.12 | X | X | O |

TABLE 3

|  | OUTER DIAMETER OF POF [mm] | INNER JACKETING LAYER | | | | OUTER JACKETING LAYER | | | | |
|---|---|---|---|---|---|---|---|---|---|---|
|  |  | RESIN | FLAME RETARDANT | PIGMENT | THICKNESS [mm] | RESIN | SURFACE MODIFIER | MFR* AFTER MODIFICATION OF FLUIDITY [g/10 min] | PIGMENT | THICKNESS [mm] |
| Example 6 | 0.75 | EEA 1 | — | 0.45% BY MASS OF CARBON BLACK | 125 | 2F/6F | 10% BY MASS OF PMMA | 10.75 | 5% BY MASS OF ZINC OXIDE | 250 |
| Example 7 | 0.75 | EEA 2 | Mg(OH)$_2$/RED PHOSPHORUS = 45/5 [% BY MASS] | 0.45% BY MASS OF CARBON BLACK | 180 | 2F/3FCl | 10% BY MASS OF PA 12 | 7.32 | 5% BY MASS OF TITANIUM DIOXIDE | 195 |

TABLE 3-continued

| | | | | | | | | | | |
|---|---|---|---|---|---|---|---|---|---|---|
| Example 8 | 1.0 | EEA 2 | Mg(OH)$_2$/RED PHOSPHORUS = 45/5 [% BY MASS] | 0.45% BY MASS OF CARBON BLACK | 200 | 2F/3FCl | 10% BY MASS OF PA 12 | 7.32 | 5% BY MASS OF TITANIUM DIOXIDE | 50 |
| Example 9 | 1.0 | EEA 1 | — | 0.45% BY MASS OF CARBON BLACK | 125 | 2F/3FCl | 10% BY MASS OF PA 12 | 7.32 | 5% BY MASS OF TITANIUM DIOXIDE | 125 |
| Example 10 | 1.0 | EEA 2 | Mg(OH)$_2$/RED PHOSPHORUS = 45/5 [% BY MASS] | 0.45% BY MASS OF CARBON BLACK | 150 | 2F/3FCl | 10% BY MASS OF PA 12 | 7.32 | 5% BY MASS OF TITANIUM DIOXIDE | 450 |
| Example 11 | 1.0 | EEA 2 | Mg(OH)$_2$/RED PHOSPHORUS = 45/5 [% BY MASS] | 0.45% BY MASS OF CARBON BLACK | 300 | 2F/3FCl | 10% BY MASS OF PA 12 | 7.32 | 5% BY MASS OF TITANIUM DIOXIDE | 300 |
| Example 12 | 1.0 | EEA 1 | — | 0.45% BY MASS OF CARBON BLACK | 150 | 2F/6F | 10% BY MASS PMMA | 10.75 | 5% BY MASS OF ZINC OXIDE | 450 |
| Example 13 | 1.0 | EEA 1 | — | 0.45% BY MASS OF CARBON BLACK | 300 | 2F/6F | 10% BY MASS PMMA | 10.75 | 5% BY MASS OF ZINC OXIDE | 300 |

| | OUTER DIAMETER OF CABLE [mm] | STEINER TUNNEL FIRE TEST | | | | STRIPPING PROPERTY OF COVERING | APPEARANCE |
|---|---|---|---|---|---|---|---|
| | | MAXIMUM FLAME | OPTICAL DENSITY (MAXIMUM VALUE) | OPTICAL DENSITY (AVERAGE VALUE) | PASS OR FAIL | | |
| EXAMPLE 6 | 1.5 | 0.6 ft | 0.03 | 0.01 | O | O | O |
| EXAMPLE 7 | 1.5 | 1.0 ft | 0.11 | 0.01 | O | O | O |
| EXAMPLE 8 | 1.5 | 0.6 ft | 0.18 | 0.05 | O | O | O |
| EXAMPLE 9 | 1.5 | 0.6 ft | 0.06 | 0.02 | O | O | O |
| EXAMPLE 10 | 2.2 | 0.6 ft | 0.09 | 0.01 | O | O | O |
| EXAMPLE 11 | 2.2 | 0.6 ft | 0.47 | 0.13 | O | O | O |
| EXAMPLE 12 | 2.2 | 0.6 ft | 0.08 | 0.01 | O | O | O |
| EXAMPLE 13 | 2.2 | 0.6 ft | 0.42 | 0.07 | O | O | O |

IN THE TABLE, THE ABBREVIATIONS OF COMPOUNDS INDICATE THE FOLLOWING COMPOUNDS, RESPECTIVELY.
EEA 1: ETHYLENE-ETHYL ACRYLATE COPOLYMER (20% BY MASS OF ETHYL ACRYLATE UNIT)
EEA 2: ETHYLENE-ETHYL ACRYLATE COPOLYMER (35% BY MASS OF ETHYL ACRYLATE UNIT)
2F/6F: VINYLIDENE FLUORIDE/HEXAFLUOROPROPYLENE COPOLYMER (85/15 [% BY MOLE])
2F/3FCL: VINYLIDENE FLUORIDE/CHLOROTRIFLUOROETHYLENE COPOLYMER (80/20 [% BY MOLE])
*MEASUREMENT PERFORMED AT 230° C. AND 21.2 N

As listed in Table 2 the POF cables obtained in Examples 1 to 5 were excellent in appearance and stripping property of the covering resin, and exhibited high flame retardance so as to pass the Steiner tunnel fire test.

On the other hand, as described in Comparative Examples 1 and 2, the POF cables not using a fluorine-based resin as a covering material of the cable were not possible to pass the Steiner tunnel fire test. In addition, as in Comparative Example 3, a POF cable using PVC resin for the inner jacketing layer emitted a large number of smoke components and thus was not possible to pass the fire test. Furthermore, the adhesion between PVC of the inner jacketing layer and the fluorine-based resin of the outer jacketing layer was poor and thus it was difficult to strip off the jacketing layer with a commercially available wire stripper.

In addition, in Comparative Example 4, in which the inner jacketing layer and the outer jacketing layer were covered in reverse order to Example 1, the flame in the fire test was spread and it was not possible to suppress the spreading of flame to 5 ft or lower of the standard of the fire test. The reason for this can be presumed as that since, as listed in Example 1, EEA resin, which is relatively inflammable compared to the fluorine-based resin with high flame retardance, was the outer layer, the POF cable was poor in self-extinguishing and thus it was not able to suppress the spreading of flame.

Table 3 exhibits the results of the fire test of the POF cables, in which the outer diameter of the POF strand or the thickness ratio of the inner jacketing layer and the outer jacketing layer is changed. As can be confirmed from these results, the POF cable, in which the thickness ratio of the inner jacketing layer and the outer jacketing layer is in a predetermined range, exhibits flame retardance enough to pass the Steiner tunnel fire test. On the other hand, the POF cable with a thickness ratio other than the predetermined range exhibits high optical density (smoke evolution at the time of combustion).

REFERENCE SIGNS LIST

11A . . . core
11B . . . cladding

12 ... POF
13 ... inner jacketing layer
14 ... outer jacketing layer

The invention claimed is:

1. A plastic optical fiber cable comprising a plastic optical fiber and a jacketing layer covering the plastic optical fiber selected from the group consisting of:
  (A) A plastic optical fiber cable comprising a plastic optical fiber and a jacketing layer covering the plastic optical fiber wherein the jacketing layer comprises at least two layers of an inner layer and an outer layer, the inner jacketing layer includes a resin comprising a copolymer of olefin and a (meth)acrylic compound, and the outer jacketing layer is constituted by a fluorine-based resin with a fluorine atom content of 50% by mass or more as a main constituent and, in addition to the fluorine-based resin, a surface modifier, wherein the surface modifier is a compound having a MFR defined in JIS K7210-1999 of 10 to 500 g/10 min;
  (B) A plastic optical fiber cable comprising a plastic optical fiber and a jacketing layer covering the plastic optical fiber wherein the jacketing layer comprises at least two layers of an inner layer and an outer layer, the inner jacketing layer includes a resin comprising a copolymer of olefin and a (meth)acrylic compound, and the outer jacketing layer is constituted by a fluorine-based resin with a fluorine atom content of 50% by mass or more as a main constituent and, in addition to the fluorine-based resin, a surface modifier, wherein the outer jacketing layer has a MFR as defined in JIS K7210-1999 of a mixture of the fluorine-based resin and the surface modifier of 3 to 50 g/10 min; and
  (C) A plastic optical fiber cable comprising a plastic optical fiber and a jacketing layer covering the plastic optical fiber wherein the jacketing layer comprises at least two layers of an inner layer and an outer layer, the inner jacketing layer includes a resin comprising a copolymer of olefin and a (meth)acrylic compound, and the outer jacketing layer is constituted by a fluorine-based resin with a fluorine atom content of 50% by mass or more as a main constituent and, in addition to the fluorine-based resin, a surface modifier that is at least one kind selected from the group consisting of (meth)acrylic ester-based resin, polyamide-based resin, and a copolymer thereof.

2. The plastic optical fiber cable according to claim 1, wherein said plastic optical fiber cable is (A).

3. The plastic optical fiber cable according to claim 1, wherein said plastic optical fiber cable is (B).

4. The plastic optical fiber cable according to claim 1, wherein said plastic optical fiber cable is (C).

5. The plastic optical fiber cable according to claim 1, wherein the olefin is an alkene having 2 to 6 carbon atoms.

6. The plastic optical fiber cable according to claim 1, wherein the olefin is ethylene.

7. The plastic optical fiber cable according to claim 1, wherein the fluorine-based resin includes a resin including at least one kind selected from the group consisting of a vinylidene fluoride-trifluoroethylene-based copolymer, a vinylidene fluoride-tetrafluoroethylene-based copolymer, a vinylidene fluoride-hexafluoropropylene-based copolymer, a vinylidene fluoride-chlorotrifluoroethylene-based copolymer, and a vinylidene fluoride-tetrafluoroethylene-hexafluoropropylene-based copolymer.

8. The plastic optical fiber cable according to claim 1, wherein a content of a (meth)acrylic compound unit in the copolymer of olefin and a (meth)acrylic compound is 5 to 40% by mass.

9. The plastic optical fiber cable according to claim 1, wherein the copolymer of olefin and a (meth)acrylic compound is at least one kind selected from the group consisting of ethylene-ethyl acrylate copolymer, ethylene-acrylic acid copolymer, and ethylene-butyl acrylate copolymer.

10. The plastic optical fiber cable according to claim 1, wherein the olefin is an alkene having 2 to 6 carbon atoms, the fluorine-based resin includes a resin including at least one kind selected from the group consisting of a vinylidene fluoride-trifluoroethylene-based copolymer, a vinylidene fluoride-tetrafluoroethylene-based copolymer, a vinylidene fluoride-hexafluoropropylene-based copolymer, a vinylidene fluoride-chlorotrifluoroethylene-based copolymer, and a vinylidene fluoride-tetrafluoroethylene-hexafluoropropylene-based copolymer, and the copolymer of olefin and a (meth)acrylic compound is at least one kind selected from the group consisting of ethylene-ethyl acrylate copolymer, ethylene-acrylic acid copolymer, and ethylene-butyl acrylate copolymer.

11. The plastic optical fiber cable according to claim 10, wherein a content of a (meth)acrylic compound unit in the copolymer of olefin and a (meth)acrylic compound is 5 to 40% by mass.

12. The plastic optical fiber cable according to claim 10, wherein the olefin is ethylene.

13. The plastic optical fiber cable according to claim 10, wherein said plastic optical fiber cable is (A).

14. The plastic optical fiber cable according to claim 10, wherein said plastic optical fiber cable is (B).

15. The plastic optical fiber cable according to claim 10, wherein said plastic optical fiber cable is (C).

16. The plastic optical fiber cable according to claim 1, wherein the plastic optical fiber cable is a flame retardant plastic optical fiber cable having flame retardance satisfying a Steiner tunnel fire test of National Fire Protection Association (NFPA) standard 262.

* * * * *